United States Patent
Adema et al.

(10) Patent No.: US 8,681,483 B2
(45) Date of Patent: Mar. 25, 2014

(54) COINCIDENT FASTENERS FOR CONFIGURABLE IMAGING SYSTEMS

(75) Inventors: Dan Adema, Kitchener (CA); Bryan Hemphill, Waterloo (CA); Les Hirst, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 638 days.

(21) Appl. No.: 12/813,622

(22) Filed: Jun. 11, 2010

(65) Prior Publication Data

US 2011/0304523 A1    Dec. 15, 2011

(51) Int. Cl.
*F16B 39/00*    (2006.01)
*F16B 33/00*    (2006.01)

(52) U.S. Cl.
CPC .................................... *F16B 33/002* (2013.01)
USPC ........................ 361/679.01; 411/368; 345/1.3

(58) Field of Classification Search
CPC ........ F16B 17/00; F16B 33/002; F16B 39/04; F16B 7/18; F16B 25/0068; F16B 25/106; F16B 33/02; F16B 35/048; F16B 37/0857; F16B 39/02; F16B 39/282
USPC ............. 361/679.01, 679.02, 679.22, 679.21; 248/917–924; 411/368; 345/1.3; 349/58–60; 220/259.2, 259.4, 326, 220/4.24

See application file for complete search history.

(56) References Cited

U.S. PATENT DOCUMENTS

| | | | |
|---|---|---|---|
| 3,423,118 A * | 1/1969 | Waldo | 292/229 |
| 3,687,183 A * | 8/1972 | Rohm | 411/307 |
| 3,755,979 A * | 9/1973 | Pantazi | 52/481.2 |
| 6,059,326 A * | 5/2000 | Tramontina | 292/169 |
| 6,813,853 B1 * | 11/2004 | Tucker | 40/448 |
| 2005/0099063 A1 * | 5/2005 | Yang et al. | 303/116.4 |
| 2007/0009338 A1 * | 1/2007 | Hull | 411/34 |
| 2008/0284675 A1 | 11/2008 | Perkins et al. | |
| 2008/0316690 A1 * | 12/2008 | Kim | 361/681 |
| 2009/0111072 A1 * | 4/2009 | Lombardo et al. | 433/174 |

\* cited by examiner

*Primary Examiner* — Anthony Haughton
*Assistant Examiner* — Ingrid Wright
(74) *Attorney, Agent, or Firm* — Perry + Currier Inc.; Stephen Perry; Dolly Kao

(57) ABSTRACT

A coincident fastener for use with a display unit of a configurable imaging system, comprising a screw for insertion through the display unit, wherein the screw includes a head portion, a threaded male portion at an end of the screw opposite the head portion, and an anti-rotation locking mechanism for locking the screw relative to the display unit.

7 Claims, 4 Drawing Sheets

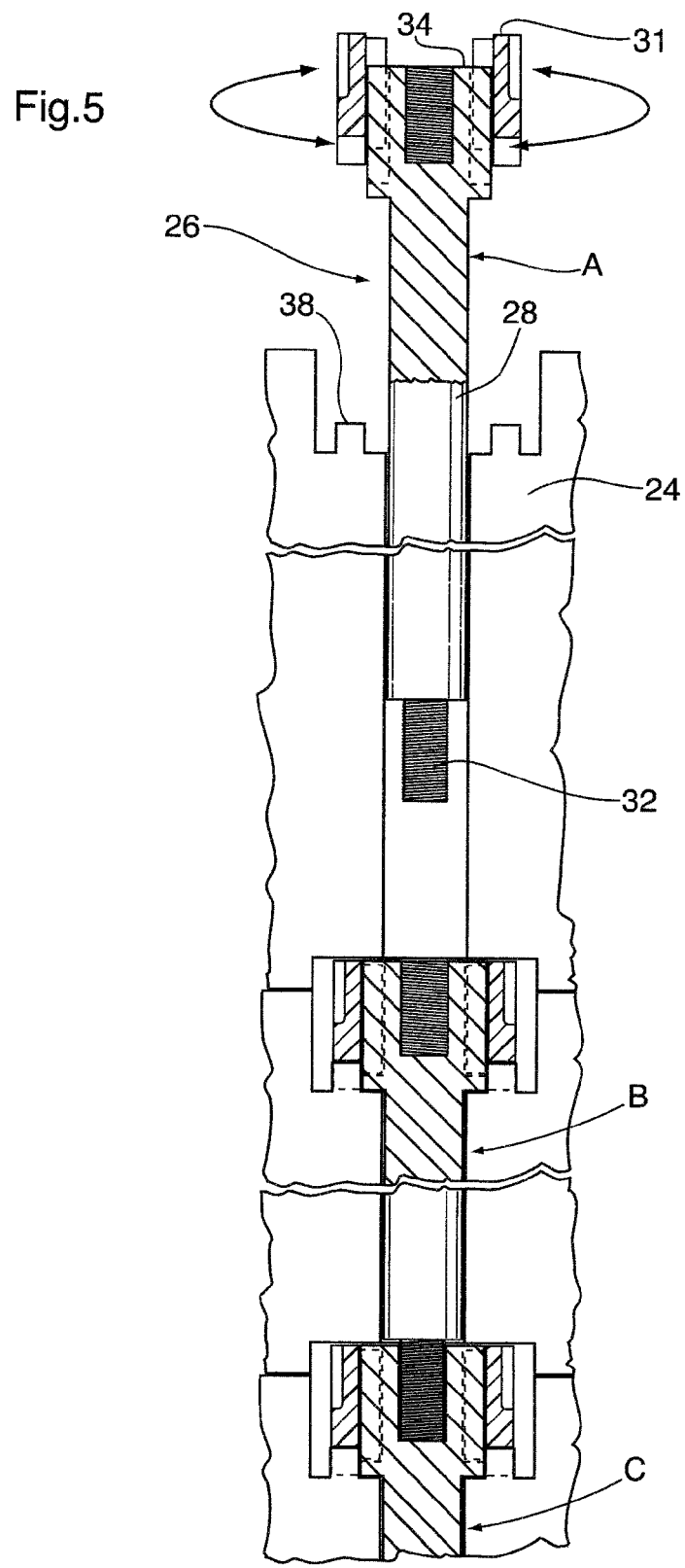

COINCIDENT FASTENERS FOR CONFIGURABLE IMAGING SYSTEMS

FIELD

The present invention relates to configurable imaging systems having a plurality of display units for generating respective portions of a composite image, and more particularly to a fastener for connecting adjacent display units of a configurable imaging system.

BACKGROUND

A large number of applications and potential applications exist for imaging systems such as projection displays that are used to display information. Such applications include, but are not limited to, general indoor signage (e.g. shopping malls, arcades, etc.), transportation signage (e.g. arrival/departure times, etc.), in-lobby signage for office buildings, control rooms, restaurants signage, etc.

It is known to provide large displays for signage and the like by assembling a multiplicity of individual display units in an array (see, for example, United States Patent Publication No. 2008/0284675, the contents of which are incorporated herein by reference). The construction of each individual display unit is preferably similar and may include a chassis for housing projection lamps, electronic circuits, etc., and a rear projection screen.

A modular array of display units may be created by connecting or attaching together adjacent display unit chassis. The attachment system should be simple and reversible, in order to permit re-configuring the array in different shapes. For example, in order to simplify the construction and deconstruction of the array it may be advantageous to provide an attachment system that is accessible from the top of each display unit chassis. For example, a long screw may be inserted into the top of a first display unit chassis so as to extend through the chassis and protrude from the bottom for insertion into a complementary female thread of a further display unit on which the first display unit is stacked. However, if the units are of identical construction a difficulty arises since the screw from the first (upper) display unit will be coincident with the screw used to connect the second (lower) display unit to any additional display unit on which it is stacked.

SUMMARY

According to an aspect of this specification, there is set forth a coincident fastener for use with a display unit of a configurable imaging system, comprising a screw for insertion through the display unit, wherein the screw includes a head portion, a threaded male portion at an end of the screw opposite the head portion, and an anti-rotation locking mechanism for locking the screw relative to the display unit.

According to a further aspect of this specification, there is set forth an imaging system, comprising a plurality of display units; a plurality of fasteners for connecting adjacent ones of the display units; and a plurality of anti-rotation locking mechanisms for locking the fasteners relative to respective ones of the display units.

BRIEF DESCRIPTION OF THE DRAWINGS

Embodiments will now be described, by way of example only, with reference to the attached Figures, wherein:

FIG. 5 is a cross-section detail view through multiple stacked display units connected using the long screws of FIGS. 2-4.

A skilled person in the art will understand that the drawings are for illustrative purposes only. The drawings are not intended to limit the scope of the applicant's teachings in any way.

DESCRIPTION OF EXEMPLARY EMBODIMENTS

Figure 1:
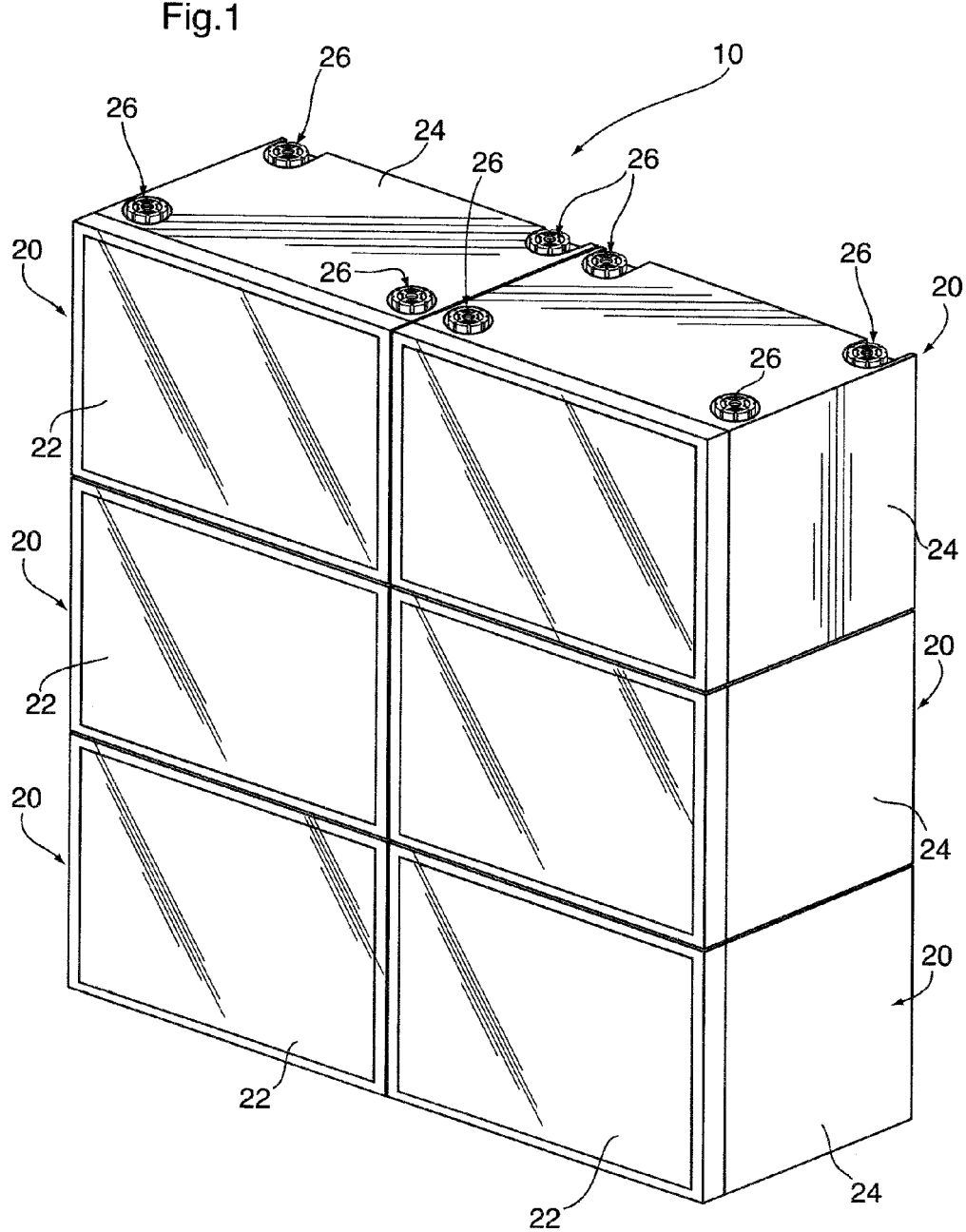
FIG. 1 shows a configurable imaging system having a plurality of display units for generating respective portions of a composite image.

In FIG. 1, an exemplary imaging system 10 is shown comprising a plurality of imaging units 20 assembled to form an array. Exemplary units are described in Applicant's co-pending United States Patent Publication No. 2008/0284675. The front surface of each display unit 20 comprises a projection screen 22 that is connected to a chassis 24. Multiple display units may be vertically stacked and connected via fasteners 26, discussed in greater detail below with reference to FIG. 2-5.

Within the chassis 24 of each display unit 20 are a plurality of electronic and optical components (not shown) for displaying images on the screen 22. According to an exemplary embodiment, the electronic and optical components may include a small rear projector, including a light source, light valve, optics and associated electronics. The light source may, for example, be implemented using LEDs, although it is contemplated that lasers or other light sources may be utilized, the selection and implementation of which would be known to a person of ordinary skill in the art. The chassis 24 may also contain a light engine and associated circuitry (including, for example, a microprocessor, RAM frame buffer, and video processing to provide image capture, resizing, color matching, edge blending, etc).

As discussed above, each unit 20 projects a portion of a composite image (preferably at SVGA resolution to enable small pixel pitch (under 1 mm)). For example, United States Patent Publication No. 2008/0284675 discloses fully configurable display units (i.e. they are not required to be arranged in rectangular configurations), resulting in significant flexibility in terms of display design.

Figure 2:
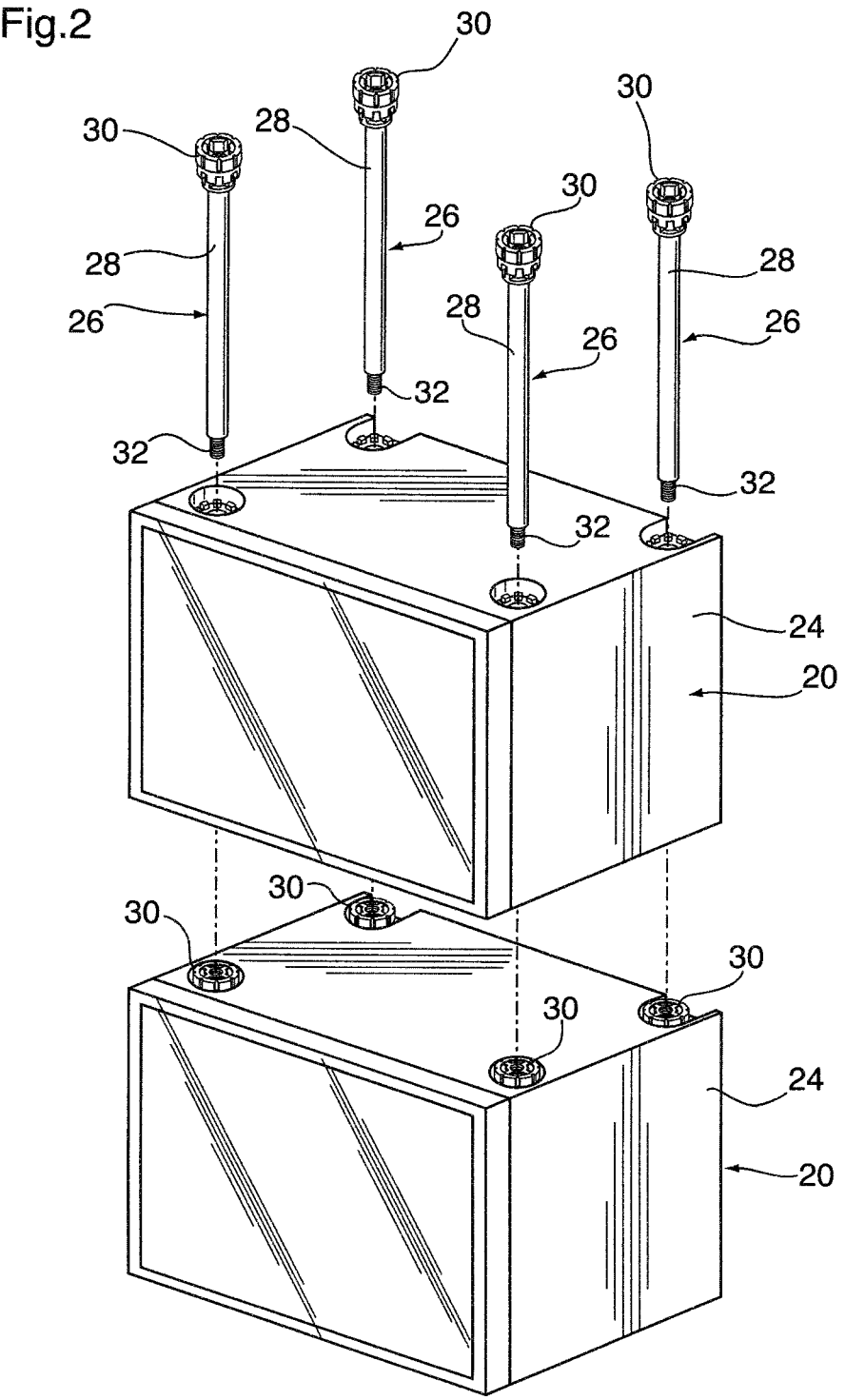
FIG. 2 shows connection or attachment of adjacent display units via a plurality of long screws that extend through the chassis of each display unit, according to an exemplary embodiment.

As shown in FIG. 2, according to an exemplary embodiment a pair of vertically stacked display units 20 may be connected or attached together by fasteners 26 in the form of long screws 28 that are inserted through respective bores in recessed portions on the top surface of each unit 20 and that extend through each chassis 24. Although four such fasteners 26 are illustrated in FIG. 2, a person of skill in the art will appreciate that fewer or a greater number of such fasteners may be utilized. Furthermore, although the fasteners are shown extending through respective display units 20 in a vertical orientation, a person of skill in the art will appreciate that the fasteners may be caused to extend through the display units 20 in a horizontal (or other) orientation.

Figure 3:
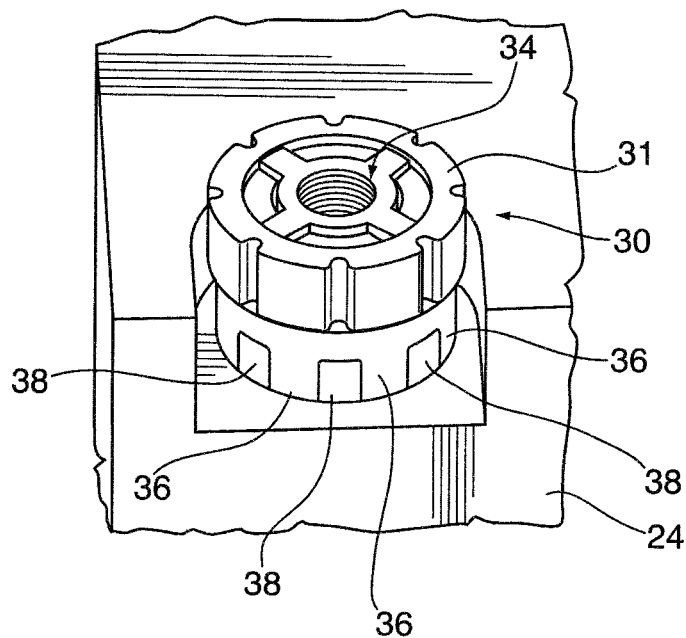
FIG. 3 shows the head of a long screw such as illustrated in FIG. 2, protruding from the top of a display unit, the head including a hand knob having an internal threaded portion for receiving a further long screw, the hand knob being in a closed and locked position to prevent rotation relative to the further screw and to the chassis, according to an exemplary embodiment.
Figure 4:
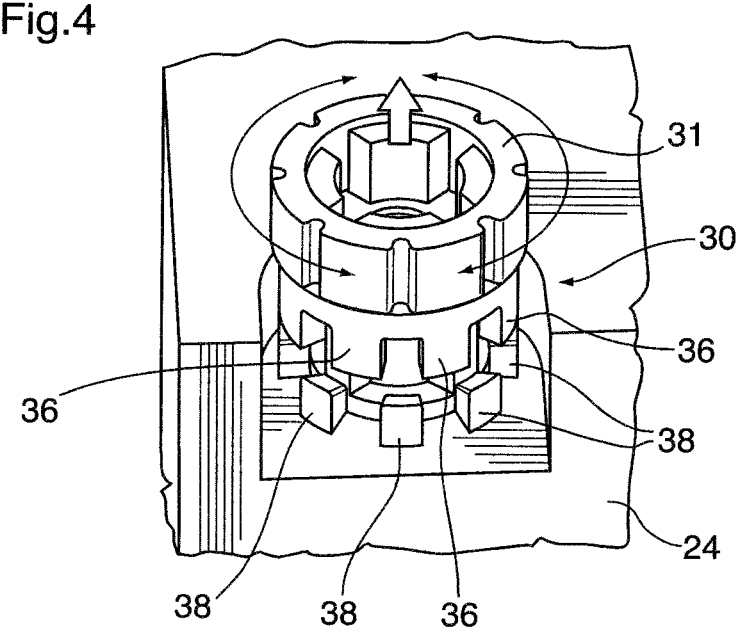
FIG. 4 shows the hand knob of FIG. 3 in an open position for tightening and loosening the screw.

As shown in FIGS. 3-5, each screw 28 includes a head 30 at one end, having a hand knob 31 that is adapted to be gripped and rotated, and a male threaded portion 32 at an opposite end of the screw. The hand knob 31 surrounds a female threaded portion 34 and is capable of sliding relative thereto along the axis of the screw 28, between a closed position (FIG. 3) and an open position (FIG. 4). The female threaded portion 34 is capable of receiving the male threaded portion 32 of another screw 28, such that multiple screws 28 may be threaded together, as shown in FIG. 5.

In order to prevent one screw 28, identified in FIG. 5 by reference "B", into which another screw 28, identified in FIG. 5 by reference "A", is connected from loosening when disassembling the array, an anti-rotation locking mechanism is provided. When the hand knob 31 of the other screw "A" is pulled to an open position, as shown in FIG. 4, the hand knob can be used to tighten (or loosen) the male threaded portion 32 of screw "A" relative to the female threaded portion 34 of screw "B". Screw "B" remains locked in position relative to the chassis 24 as a result of its hand knob 31 being collapsed to a closed position, as shown in FIG. 3, such that protrusions 36 mate with corresponding protrusions 38 of the chassis 24. Once the screw "A" has been fastened into screw "B", its hand knob 31 is pressed down from the open position of FIG. 4 to the closed position of FIG. 3, such that the screw "A" becomes locked in position.

A person of skill in the art will appreciate that alternative anti-rotation locking mechanisms may be used to prevent rotation of a screw relative to the chassis, other than the castellated mating protrusions 36 and 38 in the illustrated embodiment. For example, one alternative is to use a latch to prevent rotation of the screw. Such a latch can be disposed to the side and out of the way of screw 28 so as to permit easy dis-assembly of the array. A number of latch designs may be used in such an alternative embodiment, such as a ratchet latch in the form of a flexible rod, or a spring, etc., or a pivot latch that can, for example, be stamped or injection molded.

While generally described within the framework of 'multi-tiled' configurable projection displays, the coincident fastener set forth herein can be suitably applied to other imaging units, such as multiple displays in a control room, or to other display technologies including LED walls, LCDs, etc.

It will be appreciated that, although embodiments have been described and illustrated in detail, various modifications and changes may be made. While several embodiments are described above, some of the features described above can be modified, replaced or even omitted. All such alternatives and modifications are believed to be within the scope of the invention and are covered by the claims appended hereto.

The invention claimed is:

1. A coincident fastener for use with a display unit of a configurable imaging system, comprising a screw for insertion through said display unit, said screw including a head portion, a threaded male portion at an end of the screw opposite said head portion, and an anti-rotation locking mechanism for locking the screw relative to the display unit, wherein said head portion further comprises a hand knob that surrounds a female threaded portion and is capable of sliding relative thereto along the axis of the screw, between a closed position and an open position.

2. The coincident fastener of claim 1, wherein said anti-rotation locking mechanism comprises at least one protrusion from said hand knob for mating with a corresponding at least one protrusion from said display unit when said hand knob is in said closed position.

3. The coincident fastener of claim 2, wherein said anti-rotation locking mechanism comprises castellated mating protrusions from said hand knob and said display unit.

4. An imaging system, comprising:
a plurality of display units;
a plurality of fasteners for connecting adjacent ones of said display units; and
a plurality of anti-rotation locking mechanisms for locking said fasteners relative to respective ones of said display units, wherein each of said display units includes a chassis having at least one bore for receiving a respective one of said fasteners, wherein each said bore is disposed within a recessed portion of a surface of said chassis, and wherein each of said fasteners comprises a long screw for insertion into said bore and having a head portion accessible from said recessed portion of said chassis and a threaded male portion that projects from said bore on an opposite side of said chassis when the screw is inserted therein.

5. The imaging system of claim 4, wherein the head portion includes a hand knob that surrounds a female threaded portion for mating with said threaded male portion and is capable of sliding relative thereto along the axis of the screw, between a closed position and an open position.

6. The imaging system of claim 5, wherein said anti-rotation locking mechanism comprises at least one protrusion from said hand knob for mating with a corresponding at least one protrusion from said recessed portion when said hand knob is in said closed position.

7. The coincident fastener of claim 5, wherein said anti-rotation locking mechanism comprises castellated mating protrusions from said hand knob and said recessed portion of said chassis.

* * * * *